United States Patent Office 3,193,396
Patented July 6, 1965

3,193,396
MANUFACTURE OF ALKALINE CURING
SALT COMPOSITION
Louis Sair, Evergreen Park, Ill., assignor to The Griffith Laboratories, Inc., Chicago, Ill., a corporation of Illinois
No Drawing. Filed Feb. 12, 1964, Ser. No. 342,838
10 Claims. (Cl. 99—222)

The present invention relates to a non-caking meat curing salt composition for providing a nitrogen-containing salt selected from the group consisting of alkali-metal nitrite and alkali-metal nitrate, and containing alkaline material for elevating the pH of the meat to be acted upon by said nitrogen-containing salt. In particular, it relates to such a composition containing sodium hydroxide as the alkaline content, especially in the presence of alkali-metal nitrite.

Fresh meat has a normal pH in the range from 5.5 to 6.2, due largely to a content of lactic acid formed at slaughter due to break-down of the blood and muscle sugar, namely, glycogen. The present invention is not only directed to providing a curing salt composition capable of fixing the cured color of the meat, but also capable of adjusting the pH upward to improve the water-binding capacity of whole meat, and the emulsifying properties of comminuted meat.

Curing salt compositions conventionally are mixtures having a major portion of sodium chloride, which permits the meat packer more accurately to measure the ingredients of minor proportion.

Curing salt compositions are commonly shipped in drums from a supplier to a meat packer, who removes portions from the drums for immediate use. When such compositions were made by mechanically mixing crystals of the separate salt ingredients, complaints by Government control authorities arose as a result of using such a mixture. The content of the nitrite salt used in curing is limited by such authorities. It was ascertained that in shipping and in distributing such bulk quantities of the mechanical mixture, gravitational separation frequently took place with the result that there were formed portions relatively deficient and portions relatively richer in nitrite salt. Use of the richer portions frequently resulted in excess use of nitrite in the curing process.

It is known that when such a mixture is very finely ground, the danger of separation is minimized, but other difficulty is encountered. Very fine particles tend to cake merely due to their size. This tendency makes the particles less mobile, thus minimizing separation. The longer such a fine-ground mass stands, the harder it cakes, making it more difficult to remove a portion of the cake for use.

In addition to using curing salt compositions, some packers employ one or more of edible phosphate salts for improving water-binding properties. These are commonly supplied separately from the curing salt composition. In attempts to supply phosphate salts as a component of the curing salt composition, difficulties are encountered, such as mechanical separation or settling, dustiness, and tendency to cake in finely ground mixtures. Because the U.S. Government sets limits on the amount of nitrite and phosphates which can be used, under its jurisdiction, it is not permitted to use mechanical mixtures containing individual phosphate salt crystals.

U.S. Federal regulations permit the use of pyrophosphates, polyphosphates and orthophosphates, other than the normal alkali-metal orthophosphates, because of their mild alkalinity. Stronger alkalis such as trisodium phosphate, sodium carbonate, sodium hydroxide and their potassium equivalents function as desired, but are not permitted. Such strong alkalis are too corrosive and dangerous to handle and tend to dustiness.

In improving the water-binding properties of meat, the elevated pH resulting from use of alkalis is the important factor. In doing this with phosphates, the phosphate radical remains as a residue in the meat. If alkali-metal carbonates and hydroxides were permitted, no such undesired residue would be formed. Also, cost-wise, the alkaline agent would be less expensive by providing alkalinity with carbonate or hydroxide.

Among the alkaline agents available for the present invention are the alkali-metal carbonates and hydroxides. These are preferred because they introduce no acid residue as do, for example, certain salts derived from phosphoric acid. The hydroxides are more desirable for all purposes, since there is no possible generation of gas bubbles in a liquor or within a meat mass, as can result from the use of carbonates.

Sodium or potassium hydroxide as a single entity ingredient of a curing salt composition is most undesirable. In a comminuted form when freshly prepared and maintained dry, it is dusty and thereby is an irritant to those handling the composition. On standing in humid conditions, its hygroscopicity leads to caking of a mass containing it.

By means of the present invention, an alkali-metal hydroxide may be incorporated into a curing salt composition without exhibiting dustiness, and with a reduction of irritation to the skin in contact with it and with a greatly reduced hygroscopicity.

It is a general object of the invention to prepare a granular curing salt composition with a particle-size distribution such that all the size fractions thereof are substantially uniform in chemical composition with respect to at least one of the chemical ingredients.

It is a particular object to produce such a composition which is free-flowing, non-caking, and also non-hygroscopic when alkali-metal hydroxide is present.

The process generally is to prepare a finely divided mixture of the ingredients which is uniform in composition, mechanically to apply pressure in a manner to produce bonded caked forms of the mixture, and then to fracture the cakes to provide a composition such that the size-fractions are aggregates of all the original particles and fractions thereof have substantially the same composition as the original mixture with respect to at least one of the ingredients.

To achieve the desired results a uniform mixture of suitably finely-divided crystals is purposely bonded to caked or agglomerated form by mechanical compaction. To produce individual particles of substantially the same composition the caked or agglomerated forms are ground or comminuted to a desired fineness, but of a minimum coarseness predetermined as indicated hereinafter. Comminution is best done and controlled by passing the cake through the nip of grinding rolls set apart to control the size. Several passes are preferred, as by passing the material through a bank of such set rolls, for example, three in number, each following set being more closely spaced.

Caking may be effected in one way by mechanically squeezing together the particles of the original mixture. This may be done by mechanically compressing the individual original crystals into sheet, cake, pellet or briquette form.

One way is to extrude a rod-like form and to chop off pellets as extruded. Pellets must not be smaller than a minimum size predetermined as indicated below. Another way is to pass a mass of the original crystals through the nip of heavy compression rolls, exerting heavy pressure, so that sheet-like forms are produced of thickness, for example, 1/16 to 1/8-inch. Such forms may be further fragmented to facilitate further comminution as described.

The final product need not have particles of uniform size and its particle-size distribution must yield size-fractions all having substantially the same composition as the original mixture with respect to at least one critical ingredient, and preferably to all. These are criteria for limiting the fineness of the ultimate product. These criteria are not necessarily those of the original mixture, because the very act of compacting the original mixture can fracture larger sizes to fill spaces in producing the caked forms. Therefore, the ultimate smallest particle-size distribution of formed pellets, or of size-reduced caked forms is determined by analytical procedure for a given original mixture and the processing thereof. The size fractions of the ultimate product must have an acceptable uniform composition with respect to one or more components which are critically controlled in use of the product, especially the nitrite content.

The larger the sizes of the ultimate product up to the original caked forms, the more certain is the composition to be uniform. The finer the ultimate product is to be, the more important it is to check the composition by analytical control.

Although large cake sizes may be shipped or stored as the ultimate product, that is not commercially practicable. They provide too much void and wasted space in a container, and they permit movement in shipping, thereby wearing away of larger pieces to fines or dust of variable composition. An average size is preferred which packs tightly, but remains in free-flowing form.

Although sodium hydroxide is the preferred alkaline agent for the present invention, other agents having edible ions, alone or in combinations, may be used, such as trisodium phosphate, disodium phosphate, sodium tripolyphosphate, tetrasodium pyrophosphate, sodium carbonate, sodium bicarbonate, and the potassium salts corresponding to said sodium salts.

Where phosphates are used, it is observed that the U.S. regulations permit as much as 27 lbs. of "phosphate" per 50 gallons of pickle when pumped to 10% of added weight in curing meat such as hams. Where sodium nitrite is used in making a pickling brine, not over two pounds of sodium nitrite may be used per 100 gallons, when pumped to 10% increase in weight.

Typical compositions for a curing salt are given in Table I for the purpose only of illustration. These may be used in amount of 35 pounds per 100 gallons of pickle.

*Table I*

| Composition | Percentage by weight | | | | |
|---|---|---|---|---|---|
| | A | B | C | D | E |
| Sodium nitrite | 4.6 | 4.6 | 4.6 | 4.6 | 4.6 |
| Sodium nitrate | 3.4 | 3.4 | 3.4 | 3.4 | 3.4 |
| Sodium chloride | 0 | 0 | 0 | 40.5 | 52.0 |
| Disodium phosphate duohydrate | 92.0 | 0 | 0 | 0 | 0 |
| Sodium tripolyphosphate | 0 | 92.0 | 0 | 0 | 0 |
| Sodium pyrophosphate | 0 | 0 | 92.0 | 0 | 0 |
| Sodium carbonate | 0 | 0 | 0 | 51.5 | 0 |
| Sodium hydroxide | 0 | 0 | 0 | 0 | 40.0 |

Throughout this specification, the term "alkalinity" of a composition is employed. It is the measure of ml. of 0.1 N hydrochloric acid required to titrate to pH of 6 a solution of one gram of the composition in 100 ml. of water.

In producing Compositions A through E, 250 pounds of the raw material ingredients were blended. These were sampled for analysis for particle-size distribution, for the alkalinity of the size fractions, and for their nitrite content.

The remainder of each batch was ground fine so that substantially all of it passed a 200-mesh screen. The fine-ground compositions were then compacted, both dry, and with 2% of added water. After compaction at various pressures, the compacted material was dried, then ground.

COMPOSITION A.—DISODIUM PHOSPHATE DUOHYDRATE

The raw materials used had a particle-size distribution as follows:

*Table II*

| Mesh | Percent by weight | | |
|---|---|---|---|
| | $Na_2HPO_4.2H_2O$ | $NaNO_2$ | $NaNO_3$ |
| On 50 | 68 | 37 | 14 |
| On 100 | 24 | 45 | 15 |
| On 200 | 2 | 14.7 | 11.8 |
| Through 200 | 6 | 3 | 59 |

The mechanical mixture of the raw ingredients was analyzed for particle-size distribution, and the fractions were analyzed for nitrite content and for alkalinity, as set forth in Table III.

*Table III*

| | Mesh | | | |
|---|---|---|---|---|
| | On 50 | On 100 | On 200 | Through 200 |
| The mixture (percent) | 54 | 40 | 4.7 | 1.3 |
| Sodium nitrite (percent) | 2.20 | 4.9 | 17.25 | 13.5 |
| Alkalinity | 45.6 | 44.2 | 31.4 | 9.4 |

Table III demonstrates that the original mixture easily separates into fractions not uniform in nitrite content and in alkalinity.

After grinding the original mixture so that nearly all of it passes a 200-mesh screen, the particle-size distribution was determined, and the size-fractions analyzed for nitrite content and alkalinity. The results are shown in Table IV.

*Table IV*

| | Mesh | | | |
|---|---|---|---|---|
| | On 150 | On 200 | On 270 | Through 270 |
| The mixture (percent) | 11 | 32 | 22 | 35 |
| Sodium nitrite (percent) | 3.25 | 3.90 | 4.65 | 4.55 |
| Alkalinity | 56 | 54.2 | 54 | 53.5 |

The uniformity of composition is improved, but the fineness leads to dustiness, difficulty of dispersion in making a pickle, and possible caking.

The fine-ground mixture was then compacted between rolls using various pressures, measured as pounds per linear inch of roll, both dry and with 2% added water.

The compacted bodies were then ground and the same analyses made, as shown in Table V.

Table V

| Example | Pressure, lbs./in. | | On 50 | On 100 | On 200 | Through 200 |
|---|---|---|---|---|---|---|
| A-1 Dry | 3,600 | | Too soft—Crushes with fingers. | | | |
| A-2 Dry | 7,200 | | Too soft—Cannot be ground. | | | |
| A-3 Dry | 10,800 | Mixture (percent) | 41 | 16 | 31 | 12 |
| | | Nitrite (percent) | 4.3 | 4.8 | 4.5 | 3.95 |
| | | Alkalinity | 53.2 | 53.0 | 53.2 | 52.5 |
| A-4 2% H₂O | 7,200 | | Too soft—Cannot be ground. | | | |
| A-5 2% H₂O | 10,800 | Mixture (percent) | 39 | 27 | 18 | 16 |
| | | Nitrite (percent) | 4.55 | 4.8 | 5.3 | 5.55 |
| | | Alkalinity | 54.1 | 53.5 | 53.5 | 53.2 |

The uniformity of alkalinity is excellent. The uniformity of sodium nitrite content falls within 10% deviation from the median value between the two extremes, such deviation being permitted in this circumstance in Federal regulations.

The same procedure has been followed with compositions B, C, D and E, and the same series of tables are given for each composition. To facilitate comparison, the corresponding tables are identified by the same Roman number preceded by a letter designating the composition.

COMPOSITION B.—SODIUM TRIPOLYPHOSPHATE

Table B–II

| Mesh | Percent by weight of fractions of initial raw materials | | |
|---|---|---|---|
| | $Na_5P_3O_{10}$ | $NaNO_2$ | $NaNO_3$ |
| On 50 | 0 | 37 | 14 |
| On 100 | 2.5 | 45 | 15 |
| On 200 | 7.5 | 14.7 | 11.8 |
| Through 200 | 90.0 | 3 | 59 |

Table B–III
ANALYSIS OF INITIAL MIXTURE

| | Mesh | | | |
|---|---|---|---|---|
| | On 50 | On 100 | On 200 | Through 200 |
| The mixture (percent) | 2 | 5 | 21.0 | 72.0 |
| Sodium nitrite (percent) | 61.5 | 31.25 | 3.75 | 0.3 |
| Alkalinity | 4.0 | 21.8 | 44.8 | 39.8 |

The preceding initial Composition B was ground fine and analyzed as follows:

Table B–IV

| | Mesh | | | |
|---|---|---|---|---|
| | On 150 | On 200 | On 270 | Through 270 |
| The mixture (percent) | 11 | 32 | 22 | 35 |
| Sodium nitrite (percent) | 3.25 | 3.9 | 4.65 | 4.55 |
| Alkalinity | 56.0 | 54.2 | 54 | 53.5 |

The uniformity is satisfactory, but the composition is so fine it is dusty, difficult to disperse in a pickle, and likely to cake on storage. By compaction and grinding to a coarser particle-size distribution, the product can be made free-flowing, non-caking, non-dusting, easy to disperse in a pickle and uniform in composition as shown in the following table.

Table B–V

| Example | Pressure, lbs./in. | | Mesh | | | |
|---|---|---|---|---|---|---|
| | | | On 50 | On 100 | On 200 | Through 200 |
| B-1 Dry | 7,200 | Mixture (percent) | 36 | 14 | 7.5 | 42 |
| | | Nitrite (percent) | 4.55 | 4.40 | 5.10 | 4.30 |
| | | Alkalinity | 40.5 | 40.3 | 40.3 | 39.9 |
| B-2 Dry | 10,800 | Mixture (percent) | 38 | 19 | 19 | 24 |
| | | Nitrite (percent) | 4.10 | 4.10 | 4.8 | 4.00 |
| | | Alkalinity | 40.2 | 38.4 | 38.4 | 38.4 |
| B-3 2% H₂O | 1,800 | Mixture (percent) | 62.5 | 27.5 | 2.5 | 7.5 |
| | | Nitrate (percent) | 4.3 | 4.2 | 4.6 | 4.2 |
| | | Alkalinity | (¹) | (¹) | (¹) | (¹) |
| B-4 2% H₂O | 9,000 | Mixture (percent) | 45 | 19 | 16 | 20 |
| | | Nitrite (percent) | 4.2 | 4.2 | 4.2 | 4.10 |
| | | Alkalinity | 39.7 | 39.8 | 39.8 | 39.4 |

¹ Not determined.

All of the foregoing are satisfactory in uniformity and are non-caking, free-flowing, free of dustiness, and disperse readily in making a pickle.

COMPOSITION C.—TETRASODIUM PYROPHOSPHATE

Table C–II

| Mesh | Percent by weight of fractions of initial raw materials | | |
|---|---|---|---|
| | $Na_4P_2O_7$ | $NaNO_2$ | $NaNO_3$ |
| On 50 | 0 | 37 | 14 |
| On 100 | 1 | 45 | 15 |
| On 200 | 19 | 14.7 | 11.8 |
| Through 200 | 80 | 3 | 59 |

Table C-III
ANALYSIS OF INITIAL MIXTURE

|  | Mesh | | | |
|---|---|---|---|---|
|  | On 50 | On 100 | On 200 | Through 200 |
| The mixture (percent) | 1.6 | 6.5 | 27.0 | 65 |
| Sodium nitrate (percent) | 58.0 | 31.25 | 2.8 | 0 |
| Alkalinity | 11.5 | 25.8 | 46.8 | 44 |

The initial mixture was ground fine and analyzed as follows:

Table C-IV

|  | Mesh | | | |
|---|---|---|---|---|
|  | On 150 | On 200 | On 270 | Through 270 |
| The mixture (percent) | 0.5 | 6.2 | 10.0 | 83.3 |
| Sodium nitrate (percent) | ---------- | 5.25 | 29.75 | 3.75 |
| Alkalinity | ---------- | 49.2 | 45.2 | 42.0 |

The non-uniformity of alkalinity is lessened by the fine grinding but the nitrite contents vary.

By compaction and grinding to a coarser mesh, acceptable uniformity is obtainable as set forth in the following table.

Table C-V

| Example | Pressure, lbs./in. |  | Mesh | | | |
|---|---|---|---|---|---|---|
|  |  |  | On 50 | On 100 | On 200 | Through 200 |
| C-1 Dry | 14,400 | Mixture (percent) | 44 | 18 | 19 | 19 |
|  |  | Nitrite (percent) | 4.25 | 4.06 | 4.75 | 4.20 |
|  |  | Alkalinity | 42.8 | 43 | 43.8 | 43.5 |
| C-2 2% H₂O | 3,600 | Mixture (percent) | 58 | 16 | 4.5 | 21 |
|  |  | Nitrite (percent) | 4.20 | 4.20 | 4.4 | 4.2 |
|  |  | Alkalinity | 43.2 | 42.8 | 45 | 42.3 |
| C-3 2% H₂O | 12,600 | Mixture (percent) | 49.0 | 18.0 | 17 | 17 |
|  |  | Nitrite (percent) | 4.4 | 4.3 | 4.3 | 4.2 |
|  |  | Alkalinity | 43.5 | 43.2 | 42.8 | 42.8 |

The compaction of Composition C at low pressures yields fragile cakes, which do not grind well. Best results are at higher pressures.

The compositions of the above table are of excellent uniformity, free-flowing, non-caking, free from dustiness, and dispersed readily in making a pickle.

COMPOSITION D.—SODIUM CARBONATE

Table D-II

| Mesh | Percent by weight of fractions of initial raw materials | | | |
|---|---|---|---|---|
|  | Na₂CO₃ | NaNO₂ | NaNO₃ | NaCl |
| On 50 | 1.2 | 37 | 14 | 11.2 |
| On 100 | 7.2 | 45 | 15 | 76.2 |
| On 200 | 50.5 | 14.7 | 11.8 | 2.5 |
| Through 200 | 41.1 | 3 | 59 | 10.1 |

Table D-III
ANALYSIS OF INITIAL MIXTURE

|  | Mesh | | | |
|---|---|---|---|---|
|  | On 50 | On 500 | On 200 | Through 200 |
| The mixture (percent) | 5.5 | 36.0 | 38.0 | 20 |
| Sodium nitrite (percent) | 27.5 | 5.55 | 1.05 | 0.3 |
| Alkalinity | 14.2 | 21.2 | 100 | 125.8 |

The initial mixture was ground fine and analyzed as follows:

Table D-IV

|  | Mesh | | | |
|---|---|---|---|---|
|  | On 150 | On 200 | On 270 | Through 270 |
| The mixture (percent) | ---------- | 6.3 | 13.3 | 80.4 |
| Sodium nitrite (percent) | ---------- | 11.0 | 7.25 | 3.8 |
| Alkalinity | ---------- | 34.0 | 49.4 | 93.4 |

The product is not uniform in composition. By compaction and grinding to a coarser mesh, acceptable uniformity is achieved, as shown in the following table.

Table D-V

| Example | Pressure, lbs./in. |  | Mesh | | | |
|---|---|---|---|---|---|---|
|  |  |  | On 50 | On 100 | On 200 | Through 200 |
| D-1 Dry | 7,200 | Mixture (percent) | 53.0 | 18.0 | 8.0 | 22.0 |
|  |  | Nitrite (percent) | 4.4 | 4.4 | 5.2 | 4.8 |
|  |  | Alkalinity | 78 | 79.0 | 74.5 | 62.7 |
| D-2 Dry | 13,500 | Mixture (percent) | 49.0 | 24.0 | 16.0 | 11.0 |
|  |  | Nitrite (percent) | 4.65 | 4.75 | 5.1 | 4.75 |
|  |  | Alkalinity | 75.6 | 75.0 | 71.0 | 67.2 |
| D-3 2% H₂O | 14,400 | Mixture (percent) | 47.0 | 24.0 | 19.0 | 10.0 |
|  |  | Nitrite (percent) | 4.55 | 4.65 | 4.8 | 5.0 |
|  |  | Alkalinity | 73.7 | 78.2 | 76.2 | 67.0 |

The nitrite uniformity is acceptable but the alkaline uniformity is slightly more varied than in Table C-V for example. The variation in alkalinity comes in the fine fraction passing through the 200-mesh screen, which in Example D-3, comprises 10% of the mix. In commercial operations such fine fractions could be recycled as explained hereinafter. The products are non-caking, free-flowing, and free of dustiness, making them less corrosive and dangerous in handling.

COMPOSITION E.—SODIUM HYDROXIDE

Table E-II

| Mesh | Percent by weight of fractions of initial raw materials | | | |
|---|---|---|---|---|
|  | NaOH | NaNO₂ | NaNO₃ | NaCl |
| On 50 | 100 | 37 | 14 | 11.2 |
| On 100 | ---------- | 45 | 15 | 76.2 |
| On 200 | ---------- | 14.7 | 11.8 | 2.5 |
| Through 200 | ---------- | 3 | 59 | 10.1 |

Table E-III

ANALYSIS OF INITIAL MIXTURE

|  | Mesh | | | |
| --- | --- | --- | --- | --- |
|  | On 50 | On 100 | On 200 | Through 200 |
| The mixture (percent) | 40.0 | 41 | 17.0 | 2.0 |
| Sodium nitrite (percent) | 1.70 | 5.45 | 6.25 | 6.0 |
| Alkalinity | 216 | 3.2 | 4.7 | 4.5 |

The variations evident in the above table are due to the original coarseness of the sodium hydroxide. By fine grinding the above initial mixture, the product analyzes as follows:

Table E-IV

|  | Mesh | | | |
| --- | --- | --- | --- | --- |
|  | On 150 | On 200 | On 270 | Through 270 |
| The mixture (percent) | 12.5 | 12.5 | 22.5 | 52.5 |
| Sodium nitrite (percent) | 4.3 | 4.05 | 5.15 | 3.75 |
| Alkalinity | 96.3 | 95.5 | 86.7 | 90.2 |

The nitrite variation is substantial. The product tends to be dusty, corrosive, hygroscopic and commercially difficult to handle. On storage it cakes.

By compaction and grinding to a coarser mesh, these drawbacks are overcome, as shown in the following table:

Table E-V

| Example | Pressure, lbs./in. |  | Mesh | | | |
| --- | --- | --- | --- | --- | --- | --- |
|  |  |  | On 50 | On 100 | On 200 | Through 200 |
| E-1 Dry | 9,000 | Mixture (percent) | 46.0 | 16.0 | 12.0 | 25.0 |
|  |  | Nitrite (percent) | 4.4 | 4.56 | 5.3 | 3.80 |
|  |  | Alkalinity | 98.1 | 97.3 | 91.0 | 87.6 |
| E-2 2% H₂O | 9,000 | Mixture (percent) | 57.0 | 15.0 | 10.0 | 18.0 |
|  |  | Nitrite (percent) | 4.45 | 4.56 | 4.85 | 3.85 |
|  |  | Alkalinity | 99.4 | 98.8 | 91.6 | 88.4 |

The compaction appears to lock the sodium hydroxide into the agglomerates in such a way that the hygroscopicity is not exerted to the degree it is in the original mechanical mix. The product is free-flowing, and not adversely hygroscopic. The difficulties arising from a content of sodium hydroxide are greatly lessened because of locking the sodium hydroxide into an agglomerate.

All of the foregoing examples were made by fine-grinding an original mixture, compacting and then grinding to a coarser mesh than the fine-ground mixture. It is not always necessary to fine-grind the original mixture, as illustrated below.

A new series of compositions was made from mechanical mixes of different lots of raw material ingredients, but without comminuting the mechanical mixtures before compaction.

The following table gives the particle-size distribution of three new lots.

Table VI

| Mesh | $NaNO_2$ | $NaNO_3$ | NaCl |
| --- | --- | --- | --- |
| On 50 | 2.5 | 14.0 | 11.0 |
| On 100 | 35.0 | 15.0 | 76.0 |
| On 200 | 30.0 | 12.0 | 2.0 |
| Through 200 | 32.0 | 59.0 | 10.0 |

The following table gives the particle-size distribution of the alkaline agents, these being the same as given hereinabove.

Table VII

| Mesh | Figures in percent | | | | |
| --- | --- | --- | --- | --- | --- |
|  | A | B | C | D | E |
|  | $Na_2HPO_4$ | $Na_5P_3O_{10}$ | $Na_4P_2O_7$ | $Na_2CO_3$ | NaOH |
| On 50 | 68 | 0 | 0 | 1.2 | 100 |
| On 100 | 24 | 2.5 | 1 | 7.2 |  |
| On 200 | 2 | 7.5 | 19 | 50.5 |  |
| Through 200 | 6 | 90 | 80 | 41.1 |  |

The following Compositions AA through EE were made in the same proportions of ingredients as the Compositions A through E, respectively, as given in Table I above.

COMPOSITION AA.—DISODIUM PHOSPHATE DUOHYDRATE

The mechanical mixture of its ingredients which are characterized in Tables VI and VII was analyzed as follows:

Table AA-VIII

|  | Mesh | | | |
| --- | --- | --- | --- | --- |
|  | On 50 | On 100 | On 200 | Through 200 |
| The mixture (percent) | 64.0 | 25.0 | 7.0 | 4.0 |
| Sodium nitrite (percent) | 0.3 | 7.15 | 25.6 | 32.4 |
| Alkalinity | 46.2 | 42.0 | 31.3 | 18.0 |

Said Composition AA was compacted at 9,000 lbs./in. with 2% of added water. After drying the resulting agglomerates, the compacted material was ground to the following particle-size distribution.

Table AA-IX

|  | Mesh | | | |
| --- | --- | --- | --- | --- |
|  | On 50 | On 100 | On 200 | Through 200 |
| The mixture (percent) | 43.0 | 23.0 | 24.0 | 10.0 |
| Sodium nitrite (percent) | 4.55 | 4.55 | 4.5 | 5.50 |
| Alkalinity | 43.8 | 41.6 | 44.0 | 43.2 |

The nitrite uniformity is not over 10% deviation from the mean nitrite content of 5.00. The fraction highest in nitrite is the smallest one passing through 200-mesh, which in commercial practice would be recycled. The alkalinity is quite uniform. This table shows great improvement over the mechanical mix characterized in Table AA-VIII.

COMPOSITION BB.—SODIUM TRIPOLYPHOSPHATE

The mechanical mixture of its ingredients which are characterized in Tables VI and VII was analyzed as follows:

*Table BB–VIII*

|  | Mesh | | | |
|---|---|---|---|---|
|  | On 50 | On 100 | On 200 | Through 200 |
| The mixture (percent) | 1.0 | 3.0 | 11.0 | 85.0 |
| Sodium nitrite (percent) | 22.0 | 52.0 | 32.0 | 0.85 |
| Alkalinity | 2.8 | 60.0 | 26.6 | 32.8 |

The non-uniformity of the mechanical mix is evident, but can be remedied by compaction and grinding to a coarser mesh than given in the above table. The mechanical mix BB with 2% added water was compacted with 10,800 lbs./in. pressure, then dried and ground to the following mesh:

*Table BB–IX*

|  | Mesh | | | |
|---|---|---|---|---|
|  | On 50 | On 100 | On 200 | Through 200 |
| The mixture (percent) | 45.0 | 16.0 | 16.0 | 22.0 |
| Sodium nitrite (percent) | 4.1 | 5.4 | 5.10 | 3.15 |
| Alkalinity | 30.0 | 29.2 | 29.4 | 30.4 |

The result compared to that of Composition B in Table B–V shows that the particle-size distribution before compaction should not be too large, and the finer the better. Compromise for a practical limit may be determined by experience with each formulation.

COMPOSITION CC.—TETRASODIUM PYROPHOSPHATE

The mechanical mixture of its ingredients which are characterized in Tables VI and VII was analyzed as follows:

*Table CC–VIII*

|  | Mesh | | | |
|---|---|---|---|---|
|  | On 50 | On 100 | On 200 | Through 200 |
| The mixture (percent) | 1.0 | 7.0 | 25.0 | 66.0 |
| Sodium Nitrite (percent) | 11.3 | 40.0 | 8.2 | 0.85 |
| Alkalinity | 2.8 | 26.9 | 52.7 | 62.1 |

After compaction at 10,800 lbs./in. the agglomerates were ground to the following mesh:

*Table CC–IX*

|  | Mesh | | | |
|---|---|---|---|---|
|  | On 50 | On 500 | On 200 | Through 200 |
| The mixture (percent) | 42.0 | 18.0 | 12.0 | 29.0 |
| Sodium nitrite (percent) | 4.4 | 5.85 | 5.4 | 2.85 |
| Alkalinity | 50.0 | 49.2 | 49.4 | 40.9 |

The results in the preceding table compared to those in Table C–V again establish that before compaction the particle-size must not be too large, and the finer the better.

COMPOSITION DD.—SODIUM CARBONATE

The mechanical mixture of its ingredients which are characterized in Tables VI and VII was analyzed as follows:

*Table DD–VIII*

|  | Mesh | | | |
|---|---|---|---|---|
|  | On 50 | On 100 | On 200 | Through 200 |
| The mixture (percent) | 4.0 | 38.0 | 31.0 | 27.0 |
| Sodium nitrite (percent) | 3.6 | 5.0 | 28.5 | 6.7 |
| Alkalinity | 10.9 | 14.4 | 112.0 | 128.0 |

The mixture with 2% added water was compacted with 10,800 lbs./in. pressure. Then, the agglomerates were dried and ground to the following mesh:

*Table DD–IX*

|  | Mesh | | | |
|---|---|---|---|---|
|  | On 50 | On 100 | On 200 | Through 200 |
| The mixture (percent) | 36.0 | 25.0 | 19.0 | 20.0 |
| Sodium nitrite (percent) | 4.4 | 5.05 | 4.7 | 3.75 |
| Alkalinity | 80.3 | 68.7 | 65.1 | 86.0 |

The nitrite uniformity is only slightly over 10% deviation from the mean between the extremes, showing great improvement by compaction and grinding to a coarser mesh. The variations in alkalinity are also greatly improved.

COMPOSITION EE.—SODIUM HYDROXIDE

The mechanical mixture of its ingredients which are characterized in Tables VI and VII was analyzed as follows:

*Table EE–VIII*

|  | Mesh | | | |
|---|---|---|---|---|
|  | On 50 | On 100 | On 200 | Through 200 |
| The mixture (percent) | 35.0 | 49.0 | 15 | 1.0 |
| Sodium nitrite (percent) | 0.4 | 3.6 | 15.6 | 16.0 |
| Alkalinity | 224.0 | 20.0 | 4.4 | 3.0 |

The mechanical mixture after adding 2% of water was compacted at 7,200 lbs./in. pressure. Then, the agglomerates were dried and ground to a mesh as follows:

*Table EE–IX*

|  | Mesh | | | |
|---|---|---|---|---|
|  | On 50 | On 100 | On 200 | Through 200 |
| The mixture (percent) | 56.0 | 19.0 | 8.0 | 18.0 |
| Sodium nitrite (percent) | 3.75 | 4.5 | 4.0 | 4.23 |
| Alkalinity | 104.0 | 67.4 | 57.5 | 69.6 |

The nitrite value is within 10% of the mean value. The alkalinity has been distributed. Compared to the original mixture, the product is less corrosive, less dusty, less hygroscopic, and easier to handle. It dissolves more slowly than the sodium hydroxide ingredient and can be added to water without excessively rapid generation of heat. This shows that it is more desirable to use a finer grind for the original mixture.

The following description shows the effect of using compositions of this invention in curing hams. Table X shows five compositions as designated M, N, O, P and Q, made according to the compacting procedure herein described.

*Table X*

|  | Composition | | | | |
| --- | --- | --- | --- | --- | --- |
|  | M | N | O | P | Q |
| Sodium nitrite (percent) | 4.6 | 4.6 | 4.6 | 4.6 | 4.6 |
| Sodium nitrate (percent) | 3.4 | 3.4 | 3.4 | 3.4 | 3.4 |
| Sodium hydroxide | 35 | 30 | 25 | 20 | 10 |
| Sodium chloride | 57 | 62 | 67 | 72 | 82 |
| Alkalinity | 81 | 69 | 56 | 46 | 23 |

35 pounds of the Compositions M through P were made up to 100 gallons of pickle, which was used to pump hams to 10% added weight.

In pumping hams to 10% added weight having initially a pH of 6.1, it is desired to raise the pH by 0.2 to 0.3 unit of pH. The compositions made into pickles as described above have been so used and effect final pH in the hams as set forth in Table XI.

*Table XI*

Composition:                      pH of cured hams
M ---------------------------------------- 6.7
N ---------------------------------------- 6.6
O ---------------------------------------- 6.5
P ---------------------------------------- 6.4
Q ---------------------------------------- 6.3

From the foregoing, it appears that the content of sodium hydroxide in Composition Q is near the minimum required for pickles containing 35 pounds per 100 gallons, when pumping hams to 10% added weight.

The nitrite and nitrate salts may be combined into a physically homogeneous fusion product, and that product used to supply the two salts.

The following Table XII gives the fusion points of such salts, and of certain mixtures thereof.

*Table XII*

| Substance— | Approximate melting point, °C. |
| --- | --- |
| Potassium nitrate | 337 |
| Potassium nitrite | 297.5 |
| Sodium nitrate | 308 |
| Sodium nitrite | 271 |
| Sodium chloride | 804 |
| Mixed sodium nitrite, 60%–sodium nitrate, 40% | 230 |
| Mixed sodium nitrite, 60%–potassium nitrate, 40%: | |
|    Begins to melt at | 126 |
|    And is completely liquid and transparent at | 156 |
| Mixed potassium nitrite, 60%–sodium nitrate, 40%: | |
|    Begins to melt at | 139 |
|    And is completely liquid and transparent at | 172 |

There are some peculiar facts about the fusion points of mixtures. When dry nitrites and nitrates are mixed for fusion, the melting point is sharp when the same metal base, such as sodium, is used in both salts. When the metal bases differ, the melting point is spread over a wide range. This is believed due to a shifting of the equilibrium between the two salts forming perhaps four salts. It is also noted that where the metal bases differ the melting point is lower than when the metal base is the same for both salts.

Although the examples given above disclose the grinding of a mixture of the constituent particles, it is to be understood that supplies of the separate constituents may be ground, and then mixed.

In carrying out the invention, the caked forms are reduced in size varying in smallness from a coarseness which packs tightly for shipment, which does not cake because of fineness and which has a substantially uniform content in its size-fractions with respect to at least one critical ingredient. For example, the caked forms may be ground to coarse sizes, even such as rock salt, to serve the mechanical purposes of the user. It is noted, however, that the invention has been explained and exemplified by reference to an ultimate fineness much greater than need be practiced. The preferred size for general use is one of which substantially all the particles pass a 16-mesh screen and remain on a 100-mesh screen.

The invention is not limited in saleable products to those which contain the entire product of grinding a compacted mass. Since the final product has fractions of graded sizes, any grind may be fractionated to select from its fractions a composition of one or more fractions within a predetermined range of particle sizes. Such fractions as are rejected in doing this may be used as raw material for recycling through the compaction procedure, whether they be at the coarser end or at the finer end. In consequence, the original mass may be, or may include, particles which are aggregates of the component salts.

A granular form of curing salt of moderate fineness in the form desired by the meat packers, not only for mixing it directly in products for ground meat and for rubbing onto heat, but also for ready weighing and dissolution in forming brine.

The salt compositions which are the subjects of the present invention may contain additives, such as cane sugar, corn sugar, ene-diol compounds, such as sodium isoascorbate, and seasonings, which are compatible with the alkaline content and which function in the treatment of meat. It is to be understood that increase in the kinds of particles which constitute the original uniform mixture has a controlling effect on smallest permitted sizes of the ultimate product to maintain the desired uniformity of composition.

Although small amounts of alkaline material have been used in dry solid curing salt compositions as a buffering agent to protect one or more ingredients of the composition, the buffering amount is small and far below the 40 to 92 parts of alkali used per 8 parts of the selected curing salt, as given in Table I above.

The invention is not limited to or by the details and examples given above to illustrate and explain the invention, and numerous changes and modifications are contemplated as falling within the scope of the invention as expressed in the appended claims.

This application is a continuation-in-part of my earlier application Serial No. 223,269, filed September 12, 1962, now abandoned.

I claim:

1. The method of producing an alkaline curing salt composition, which composition comprises bonded aggregates of physically homogeneous particles of curing salt selected from the group consisting of alkali-metal nitrite, alkali-metal nitrate and mixtures thereof, and chemically homogeneous particles of edible-ion alkaline material in kind and quantity to elevate the pH of meat for which said composition is used, which method comprises bonding to caked forms a granular mixture of finely divided particles of the constituents of said composition which mixture is substantially uniform throughout in composition, by compacting said granular mixture with an effective mechanical pressure sufficient to lock the particles to each other so that when the said caked forms are reduced in size the size-fractions have a substantially uniform composition, and then reducing the size of said caked forms which are substantially dry to provide a mass of such particle-size distribution that all the size-fractions thereof have a substantially uniform composition.

2. The method of claim 1 wherein the caked forms are ground to a free-flowing non-caking fineness.

3. The method of claim 1 wherein said granular mixture contains sodium chloride crystals.

4. The method of producing an alkaline curing salt composition, which composition comprises bonded aggregates of physically homogeneous particles of curing salt selected from the group consisting of alkali-metal nitrite, alkali-metal nitrate and mixtures thereof, and chemically homogeneous particles of edible-ion alkaline material in kind and quantity to elevate the pH of meat for which said composition is used, which method comprises mechanically mixing supplies of the constituent particles, grinding the resulting mixture to a granular mass which is substantially uniform throughout in composition, bonding to caked forms said resulting granular mass by compacting said granular mass with an effective mechanical pressure sufficient to lock the particles to each other so that when the said caked forms are reduced in size the size-fractions have a substantially uniform composition, and then reducing the size of said caked forms which are substantially dry to provide a mass of such particle-size-distribution that all the size-fractions thereof have a substantially uniform composition.

5. The method of producing an alkaline curing salt composition, which composition comprises bonded aggregates of physically homogeneous particles of curing salt selected from the group consisting of alkali-metal nitrite, alkali-metal nitrate and mixtures thereof, and chemically homogeneous particles of alkaline material selected from the group consisting of alkaline alkali-metal orthophosphates, alkali-metal tripolyphosphate, tetrasodium and tetrapotassium pyrophosphate, alkali-metal carbonates and alkali-metal hydroxides, which method comprises mechanically mixing supplies of the constituent particles, grinding the resulting mixture to a granular mass which is substantially uniform throughout in composition, bonding to caked forms said resulting granular mass by compacting said granular mass with an effective mechanical pressure sufficient to lock the particles to each other so that when the said caked forms are reduced in size the size-fractions have a substantially uniform composition, and then reducing the size of the resulting caked forms which are substantially dry to a free-flowing granular mass of such particle-size-distribution that all the size fractions thereof have a substantially uniform composition.

6. The method of claim 5 wherein said constituent particles contain sodium chloride crystals.

7. The method of producing an alkaline curing salt composition, which composition comprises bonded aggregates of physically homogeneous particles of curing salt selected from the group consisting of alkali-metal nitrite, alkali-metal nitrate and mixtures thereof, and chemically homogeneous particles of alkaline material selected from the group consisting of alkaline alkali-metal orthophosphates, alkali-metal tripolyphosphate, tetrasodium and tetrapotassium pyrophosphate, alkali-metal carbonates and alkali-metal hydroxides, which method comprises bonding to caked forms a granular mixture of particles of the constituents of said composition which mixture is substantially uniform throughout in composition, by compacting said original mass with an effective mechanical pressure sufficient to lock the particles to each other so that when the said caked forms are reduced in size the size-fractions have a substantially uniform composition, and then reducing the size of said caked forms which are substantially dry to provide a mass of such particle-size-distribution that all the size-fractions thereof have a substantially uniform composition.

8. The method of producing an alkaline curing salt composition, which composition comprises bonded aggregates of physically homogeneous particles of curing salt selected from the group consisting of alkali-metal nitrite, alkali-metal nitrate and mixtures thereof, and chemically homogeneous particles of alkaline material selected from the group consisting of alkaline alkali-metal orthophosphates, alkali-metal tripolyphosphates, tetrasodium and tetrapotassium pyrophosphate, alkali-metal carbonates and alkali-metal hydroxides, which method comprises bonding to caked forms a granular mixture of particles of the constituents of said composition which mixture is substantially uniform throughout in composition, by compacting said granular mixture with an effective mechanical pressure sufficient to lock the particles to each other so that when the said caked forms are reduced in size the size-fractions having a substantially uniform composition, and then reducing the size of the resulting caked forms which are substantially dry to a particle-size-distribution coarser than that of said mixture and characterized by size-fractions of substantially uniform composition.

9. The method of producing an alkaline curing salt composition, which composition comprises bonded aggregates of physically homogeneous particles of curing salt selected from the group consisting of alkali-metal nitrite, alkali-metal nitrate and mixtures thereof, and chemically homogeneous particles of edible-ion alkaline material in kind and quantity to elevate the pH of meat for which said composition is used, which method comprises bonding to caked forms a granular mixture of finely ground particles of constituents of said composition which mixture is substantially uniform throughout in composition and which contains a small amount of added water, by compacting said granular mixture with an effective mechanical pressure sufficient to lock the particles to each other so that when the said caked forms are reduced in size the size-fractions have a substantially uniform composition, drying the caked forms, and then reducing the size of said caked forms which are substantially dry to provide a mass of such particle-size-distribution that all the size-fractions thereof have a substantially uniform composition.

10. The method of producing an alkaline curing salt composition, which composition comprises bonded aggregates of physically homogeneous particles of curing salt selected from the group consisting of alkali-metal nitrite, alkali-metal nitrate and mixtures thereof, and chemically homogeneous particles of edible-ion alkaline material in kind and quantity to elevate the pH of meat for which said composition is used, which method comprises bonding to caked forms a granular mixture of finely ground particles of constituents of said composition which mixture is substantially uniform throughout in composition and which contains a small amount of added water, by compacting said granular mixture with an effective mechanical pressure sufficient to lock the particles to each other so that when the said caked forms are reduced in size the size-fractions have a substantially uniform composition, and then reducing the size of the resulting caked forms which are substantially dry to a particle-size-distribution coarser than that of said mixture and characterized by size-fractions of substantially uniform composition.

References Cited by the Examiner
UNITED STATES PATENTS

| | | | |
|---|---|---|---|
| 2,054,624 | 9/36 | Griffith | 99—159 X |
| 2,054,625 | 9/36 | Griffith | 99—159 X |
| 2,400,292 | 5/46 | Dalton. | |
| 2,770,548 | 11/56 | Hall et al. | 99—159 X |
| 2,770,549 | 11/56 | Hall | 99—159 X |
| 2,770,550 | 11/56 | Hall et al. | 99—159 X |
| 2,770,551 | 11/56 | Hall et al. | 99—159 X |
| 2,828,212 | 3/58 | Sair | 99—159 X |
| 2,935,387 | 5/60 | Phillips | 71—64 X |
| 2,977,214 | 3/61 | McLellan | 71—64 |
| 3,098,767 | 7/63 | Bush | 127—63 |

A. LOUIS MONACELL, *Primary Examiner.*

HYMAN LORD, *Examiner.*